Jan. 5, 1937. P. W. SPELL 2,067,104
STALK CUTTER
Filed May 8, 1935 5 Sheets-Sheet 1

Inventor
PERRY W. SPELL
By C. R. Parker Jr.
Attorney

Jan. 5, 1937. P. W. SPELL 2,067,104
STALK CUTTER
Filed May 8, 1935 5 Sheets-Sheet 2

Inventor
PERRY W. SPELL

Jan. 5, 1937.  P. W. SPELL  2,067,104
STALK CUTTER
Filed May 8, 1935  5 Sheets-Sheet 5

Inventor
PERRY W. SPELL
By C. L. Parker Jr.
Attorney

Patented Jan. 5, 1937

2,067,104

UNITED STATES PATENT OFFICE 2,067,104

STALK CUTTER

Perry W. Spell, Roseboro, N. C.

Application May 8, 1935, Serial No. 20,458

24 Claims. (Cl. 55—62)

This invention relates to stalk cutters and is an improvement over the structure shown in my prior Patents Nos. 1,713,197, granted May 14, 1929, and 1,808,266 granted June 2, 1931.

An important object of the invention is to provide a greatly improved type of stalk cutter for uprooting and cutting stalks such as those of corn, cotton and similar plants, and to cut such stalks in relatively small pieces to permit them to be turned under the soil for fertilizing purposes.

A further object of the invention is to provide a novel form of plow for uprooting the stalks whereby they may be conveyed to the cutters.

A further object is to provide a novel arrangement of parts for preventing the accumulation of twigs, trash, etc. between the plow beam and the lower cutter.

A further object is to provide novel means for adjusting the cutting depth of the plow.

A further object is to provide novel means for elevating the forward end of the apparatus to raise the plowshare above the surface of the ground while the apparatus is being turned.

A further object is to provide novel means for locking the forward end of the apparatus in vertically adjusted positions.

A further object is to provide novel draft means for the apparatus to permit the forward end to swing laterally to accommodate itself to irregularities in the line of stalks to be cut.

A further object is to provide draft connections leading to the rear end of the apparatus to effect forward movement of the apparatus from such rear end, and to provide novel means for steering the forward end of the apparatus laterally whenever necessary.

A further object is to provide novel adjustable guide shoes for the forward end of the apparatus for guiding the stalks into the conveying means leading to the cutting knives.

A further object is to provide novel sharpening means for the cutting blades.

A further object is to provide novel means for vertically adjusting the rear end of the apparatus.

Other objects and advantages of the invention will become apparent during the course of the following description.

In the drawings I have shown one embodiment of the invention. In this showing—

Figure 14 is a fragmentary plan view of one corner of the frame of the apparatus, the corner post being shown in section, Figure 15 is a fragmentary elevation of the latching means at the forward end of the frame, and, Figure 16 is a perspective view of the plow and associated parts.

Figure 1:
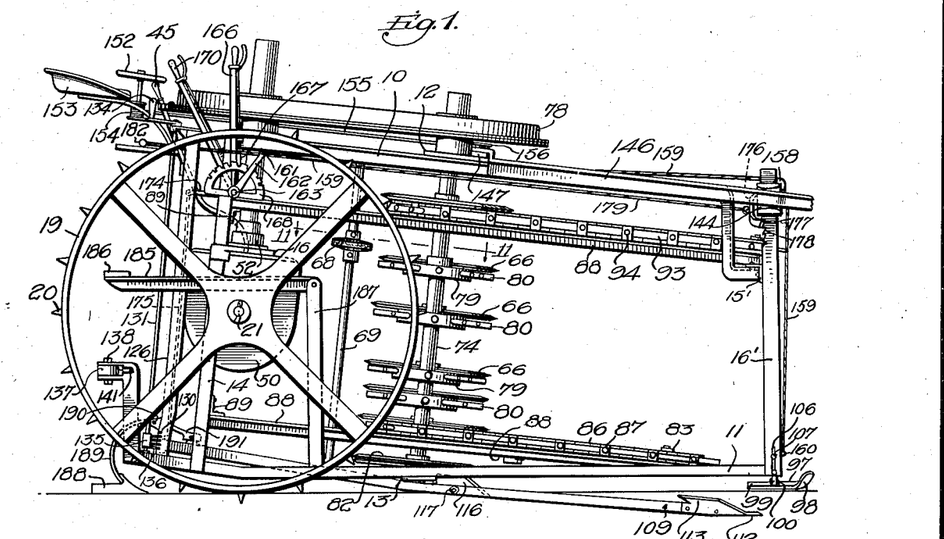
Figure 1 is a side elevation, the forward end of the draft connections and associated parts being broken away.
Figure 4:
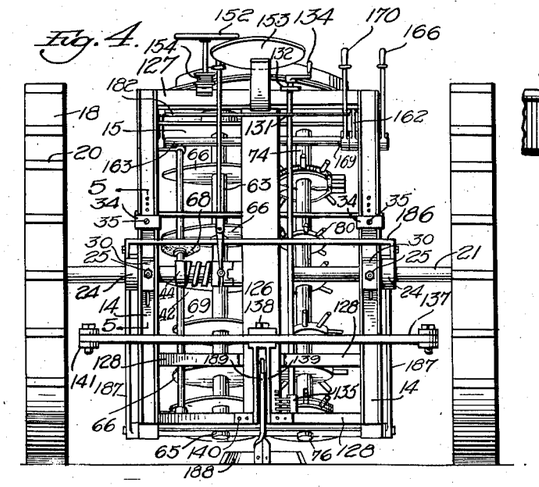
Figure 4 is a rear elevation of the same.
Figure 7:
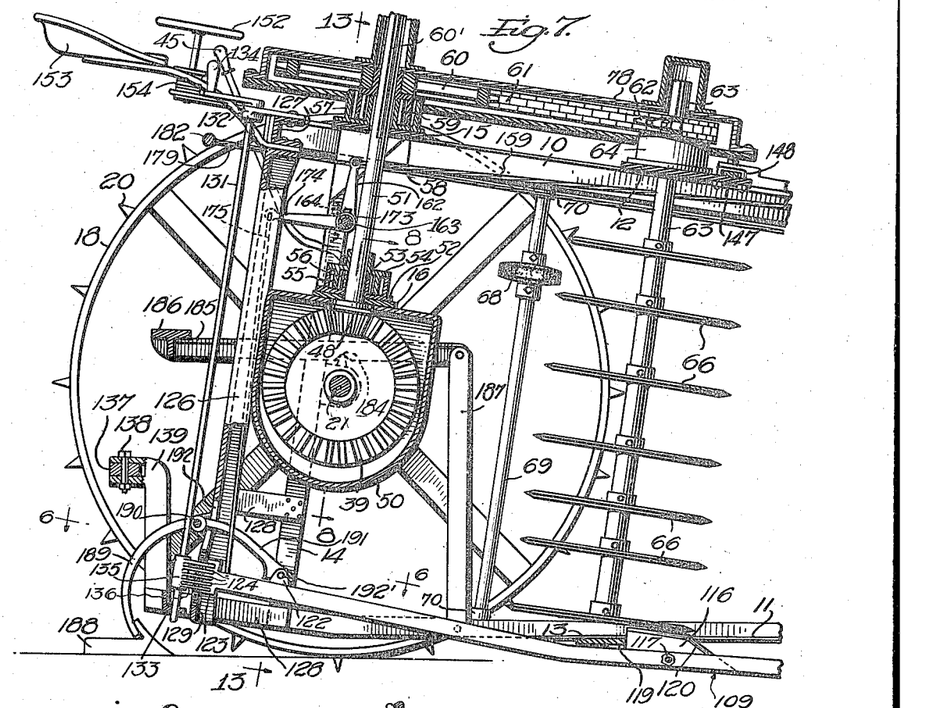
Figure 7 is a vertical sectional view taken substantially on line 7—7 of Figure 2.

Referring to the drawings, the numeral 10 designates a pair of spaced parallel upper frame members, preferably formed of angle iron and spaced above a similar pair of lower frame members 11. The upper frame members are connected by a transverse relatively heavy plate 12 (see Figures 2 and 9) and a somewhat similar plate 13 is connected between the lower frame members 11. The plates 12 and 13 are arranged substantially centrally of the length of the frame members 10 and 11 and act as braces therebetween. The plates also perform other functions to be described. The rear ends of the upper and lower frame members 10 and 11 are connected by vertical braces 14, as shown in Figures 1, 4, and 7. A transverse plate 15 is connected across the upper frame members 10, and a somewhat similar plate 16 is arranged beneath and parallel to the plate 15 and secured at its ends in a manner to be described. At the forward end of the frame, each frame member 10 extends downwardly and then forwardly and has its end connected to a transverse brace 15'. The ends of this brace are secured to vertical posts 16' anchored at their lower ends to the frame members 11. The upper ends of the posts 16' have their extremities 17' vertically slidable in openings 18' formed in a cross member 17 (see Figure 14).

The rear end of the frame is adapted to be supported by relatively large wheels 18 and 19 provided with cleats 20 and supported on an axle 21. The wheel 18 is preferably freely rotatable on the shaft or axle 21 to permit independent rotation of the wheels when turning at the end of one row to start down the next row. The wheel 19 is preferably keyed or splined to the axle 21 as at 22. Thus it will be apparent that the axle 21 is driven by the wheel 19, and rotation of the shaft 21 is utilized for driving the elements of the apparatus to be described.

Figure 5:
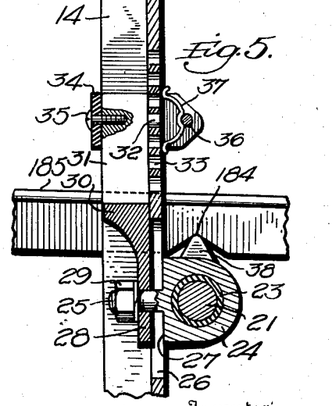
Figure 5 is an enlarged detail sectional view on line 5—5 of Figure 4.
Figure 8:
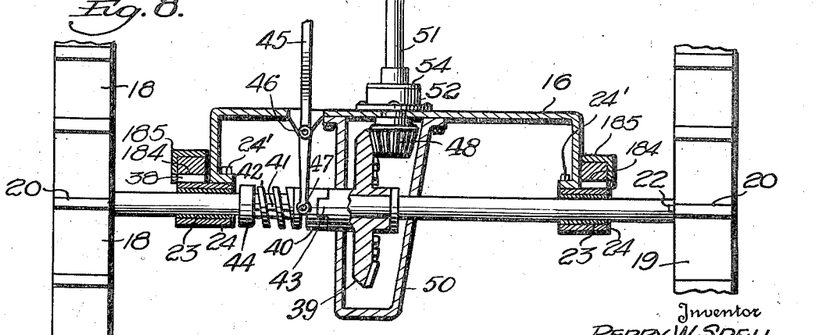
Figure 8 is a transverse sectional view on line 8—8 of Figure 7.

The axle 21 is journaled in bushings 23 carried by journal blocks 24 arranged adjacent the respective vertical frame members 14. The ends of the plate 16 are turned downwardly and then inwardly, as shown in Figure 8, and are bolted as at 24' to the upper faces of the blocks 24 for a purpose which will become apparent. Each block 24 carries a bolt 25 projecting through a slot 26 in the adjacent member 14, and each block 24 has a flat face 27 slidable against the adjacent face of the member 14. A stop member 28 is arranged inwardly of the slot 26, as shown in Figure 5. A nut 29 is threaded on the bolt 25 and is adapted to be tightened against the member 28. This stop member has its upper end broadened as at 30 to engage against the lower end of a block 31, slidable in the frame member 14, and provided at one side with a projecting lug 32 selectively engageable in openings 33 formed in the member 14. A yoke member 34 straddles the open face of the member 14 and has its base portion secured to the block 31 by a screw 35. The free ends of the arms of the yoke 34 are connected by a pin 36 against which is secured the central portion of a leaf spring 37, the free ends of this spring engaging against the member 14. The elements just described are provided for securing vertical adjustment of the rear end of the frame, and each block 24 is provided with a knife bearing 38 for a purpose to be described.

Referring to Figure 8, the numeral 39 designates a bevel gear freely mounted on the axle 21 and having a hub engageable by a clutch collar 40 splined on the axle as at 41 and urged toward the bevel gear by a spring 42. The clutch element and the hub of the bevel gear are provided with interengaging positive clutch members 43. A collar 44 engages the outer end of the spring 42, and means is provided for moving the clutch collar 40 against the tension of the spring to disengage the clutch. Such means comprises a level 45 pivotally connected as at 46 to the plate 16 and having its lower end forked and provided with pins 47 operative for moving the collar 40.

A bevel pinion 48 meshes with the gear 39 and the pinions and gears are enclosed within a housing 50 secured to the plate 16. The bevel pinion is carried by a vertically extending shaft 51, as shown in Figures 7 and 8. A housing 52 is supported on the plate 16 and has an upstanding annular flange 53 surrounding the shaft 51. A second housing 54 is secured to the shaft 51 and is provided with a depending annular flange 55 surrounding and concentric with the flange 53. Anti-friction rollers 56 are arranged between the flanges 53 and 55 and are protected by the casing 54. The casing 52 forms a grease retaining cup for the anti-friction bearings.

Figure 2:
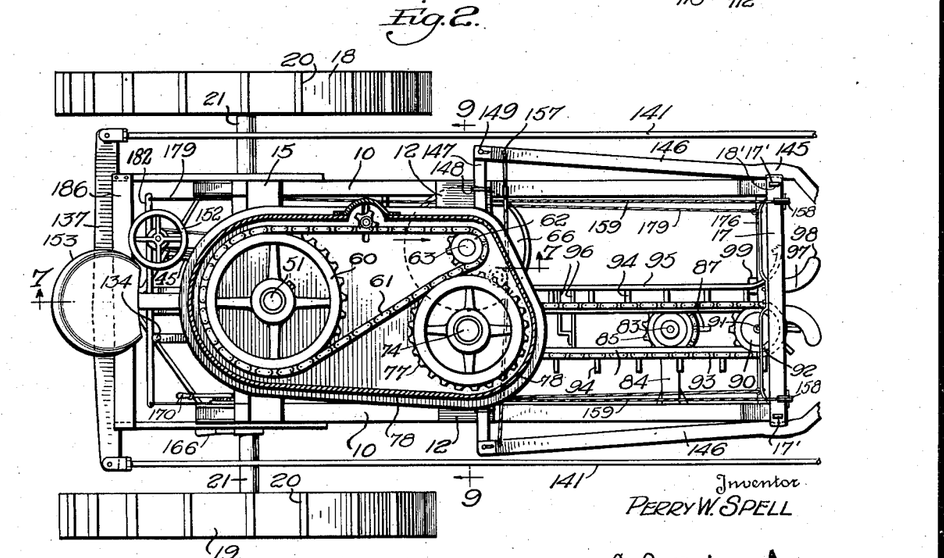
Figure 2 is a plan view of the same, parts being shown in section.

The upper end of the shaft 51 projects through the plate 15 and is journaled in bearing means similar to the bearing means just described. Such means comprises casings 57 and 58, carried respectively by the plate 15 and shaft 51 and including concentric flanges between which are mounted anti-friction rollers 59. As shown in Figures 2 and 7, a relatively large sprocket 60 is mounted on the upper end of the shaft 51 and is splined thereto as at 60' to permit upward movement of the sprocket with respect to the shaft for a purpose to be described. A chain 61 passes around the sprocket 60 and around a second smaller sprocket 62 mounted on the upper end of a vertical shaft 63. This shaft is journaled at its upper end in bearing means 64 similar to the bearing means for the shaft 51. The lower end of the shaft 63 is journaled in a bearing 65 supported by the plate 13. The shaft 63 carries a plurality of rotary cutting blades 66 for a purpose to be described.

Figures 10, 11, 12:
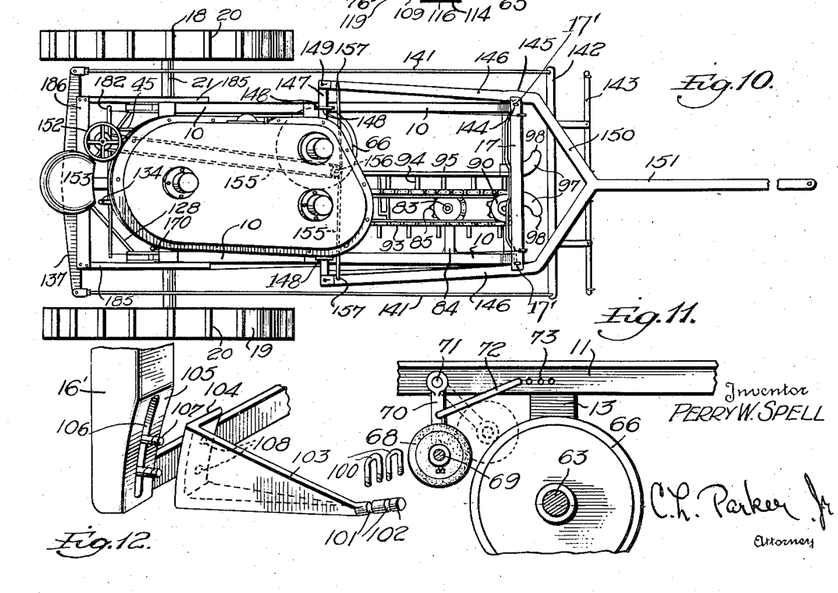
Figure 10 is a reduced plan view of the entire apparatus.
Figure 11 is a detail horizontal sectional view on line 11—11 of Figure 1.
Figure 12 is a fragmentary perspective view of one of the guide shoe supporting brackets and associated parts.

As will become apparent, the blades 66 rotate constantly during the operation of the apparatus and a sharpening stone 68 is provided for sharpening the blades. This stone is shown in detail in Figure 11 of the drawings and is circular in shape. The stone is vertically slidable on a shaft 69 supported at its upper and lower ends by arms 70 the free ends of which are pivotally supported as at 71 by the adjacent longitudinal frame members 10 and 11. A locking member 72 is adapted to lock the sharpening stone in the inoperative position shown in solid lines in Figure 11 or in the operative position shown in dotted lines. The member 72 is in the form of a rod pivotally connected at one end to one of the arms 70 and having its opposite end turned downwardly for selective engagement in openings 73 formed in the adjacent frame member 11.

A vertical shaft 74 is journaled at its upper end in bearing means 75 carried by the plate 12 and at its lower end in a bearing 76 carried by the plate 13. The upper end of the shaft 74 carries a relatively large sprocket 77 several teeth of which are engaged by the chain 61 to rotate the sprocket 77, but at a slower speed than the sprocket 62. The sprockets 60, 62, and 77 are protected by a suitable housing 78, as clearly shown in Figures 1, 7, and 9.

The shaft 74 carries a plurality of disks 79 each of which is provided with a plurality of outstanding radial fingers 80. The disks correspond in number and arrangement to certain of the cutters 66 and each disk 79 is arranged just beneath the plane of its associated cutter, as clearly shown in Figure 9. The shaft 74 likewise carries upper and lower sprockets 81 corresponding in position to the top and to the next to the bottom cutter 66 and arranged slightly below the respective planes thereof. The lowermost cutter 66 is associated with a similar rotary cutter 82 carried by the shaft 74, the two cutters being provided in this instance because of the fact that they operate against the thickest portion of a stalk.

Toward the forward end of the frame and near the bottom thereof a shaft 83 is journaled in a laterally extending arm 84 carried by the adjacent longitudinal frame member 11. A sprocket 85 is rotatably supported by the shaft 83 and a chain 86 passes around this sprocket and around the sprocket 81 previously described. The chain 86 carries a plurality of outstanding fingers 87 similar to the fingers 80 carried by the disks 79. The chain 86 is supported between its two sprockets by the lower of two pairs of rails 88, the forward ends of which also may be supported by the bracket 84. The rear ends of the pairs of rails are supported respectively by cross pieces 89 extending between the rear frame members 14 (see Figure 1).

Figure 9:
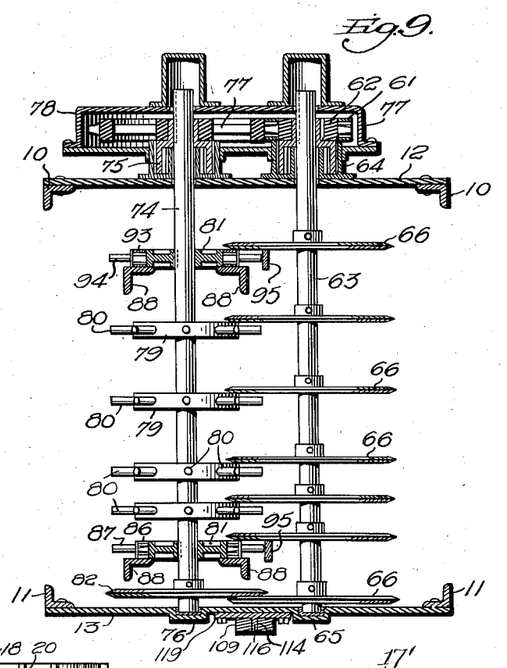
Figure 9 is a similar view on line 9—9 of Figure 2.

At the forward end of the frame and near the top thereof a sprocket 90 is journaled on a shaft 91 supported by the brace 15'. A chain 93 passes around the sprocket 90 and around the upper sprocket 81 previously described, and the chain 93 carries outstanding fingers 94, similar to the fingers 87. Between its sprockets the chain 93 is supported on the upper pair of rails 88, the forward ends of which are supported by the brace 15'. The inner runs of the chains 86 and 93 are spaced from guide rails 95, parallel thereto and fixed with respect to the main frame. As shown in Figures 2 and 9, the fingers of the inner runs of the chains 86 and 93 extend to points adjacent the guide rails 95. Thus these fingers are adapted to engage vertical plant stalks and move them rearwardly toward the cutting blades.

In their movement rearwardly toward the cutting blades the lower portions of the plant stalks engage beaters in the form of a pair of spring fingers 96. One of these fingers is secured to the other finger while the latter is secured to the adjacent outer rail 88. Thus the free ends of the fingers 96 resiliently engage the stalks, and as each escapes over the rearwardly moving stalk it provides a jerking motion tending to shake the dirt loose from the roots of the stalk.

A pair of movable shoes 97 is arranged at the forward end of the apparatus. These shoes are engageable with the ground to slide thereover and to guide the forward end of the apparatus with respect to the stalks to cause the latter to properly enter the apparatus. The shoes 97 have their forward ends turned outwardly as at 98, and these ends of the shoes turn upwardly as indicated in Figure 1. The rear portions 99 of the shoes are parallel to each other. Each shoe is provided with a pair of U-bolts 100 or similar elements which engage and move in grooves 101 formed in a trunnion 102 (see Figure 12). Each of these trunnions is carried by a tapered bracket 103 having an arcuate flange 104 at its outer end engageable against a similar arcuate face 105 formed at the lower end of each vertical frame member 16' and slotted as at 106. Bolts 107 extend through the slot 106 at each side of the apparatus and through bolt openings 108 in the flange 104, thus permitting vertical adjustment of the flange 104 to change the angularity of the trunnion 106, and consequently the angularity of each shoe 97, according to the slope of the hill of stalks along which the apparatus is operating. The U-bolts 100 provide pivotal supporting means for the shoes to permit them to swing up and down at their forward and rear ends and thus facilitate the movement of the apparatus over the ground.

A plow beam indicated by the numeral 109 is arranged beneath the apparatus, and the beam is preferably solid and rectangular in cross-section. A plow point 112 is arranged at the forward end of the apparatus to uproot the stalks and the plow point includes upwardly extending spaced parallel blades 113 which tend to cut off laterally outstanding roots. The plow point normally operates substantially in the position shown in Figure 1 to engage the stalks sufficiently deeply in the ground to uproot them.

Intermediate its ends the plow beam is provided with an elongated slot 114, and rearwardly of this slot the plow beam slopes upwardly to a greater extent than the forward end of the beam. The slot 114 is provided to receive a vertical attaching member 116. This member 10 and the beam 109 are provided with registering openings to receive a transverse bolt 117 to secure the elements referred to to each other with the plow beam pivoting about the bolt to partake of suitable adjustment in a manner to be described. The attaching member 116 is provided with a flat rear portion 119 by means of which it is secured against the bottom of the plate 13, and the forward end of the attaching member 116 slopes upwardly as at 120 to guide material on the top of the plow beam to the lowermost blade 66 and to prevent any accumulation of such material beneath the bottom blade. Near its rear end the beam 109 is provided with upstanding lugs 122 for a purpose to be described.

Figures 14, 15, 16:
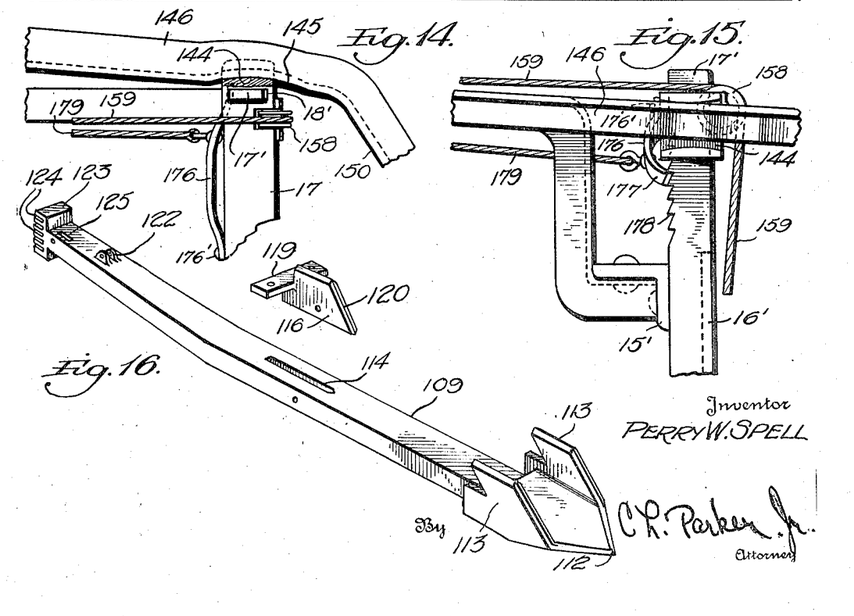

A head 123 is formed at the rear end of the plow beam and provided with rearwardly opening notches 124 in one corner thereof and forwardly of the head 123 a slot 125 is provided for a purpose to be described. The rear face of the head 123 is arcuate, as shown in Figures 7 and 16.

A vertical post 126 is arranged centrally of the width of the apparatus adjacent the rear end thereof, and this post is preferably of channeled cross section. A transverse frame member 127 is connected across the rear ends of the upper frame members 10 as shown in Figures 4 and 7, and the upper end of the post 126 is secured to the member 127. The lower end of the post 126 also is suitably braced, and for this purpose angularly arranged braces 128 are connected between the post 126 and the vertical frame members 14. The head 123 at the rear end of the plow beam is arranged within the lower end of the post 126 and the adjacent rear wall of this post is curved as at 129 to conform to the arcuate shape of the rear end of the head 123. The curved wall portion 129 is provided with a series of slots 130 in one corner thereof, these slots corresponding in relationship to the relationship of the slots 124.

Figure 6:
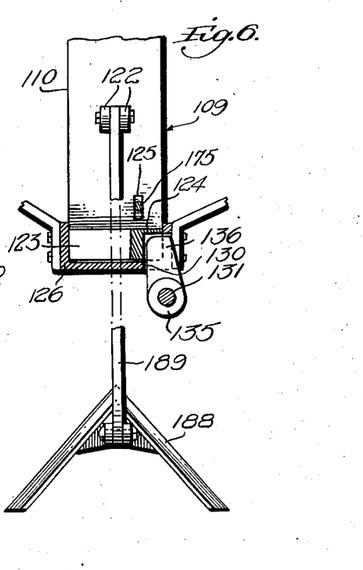
Figure 6 is an enlarged fragmentary sectional view of line 6—6 of Figure 7.

A vertical shaft 131 is arranged rearwardly of the post 126 and is journaled in upper and lower bearings 132 and 133. The upper end of the shaft 131 is provided with an operating handle 134, and a locking member 135 is carried by the lower end of the shaft 131 and is provided with a plurality of fingers 136 movable through the slots 130 for engagement with the slots 124 (as shown in Figure 6). This means is provided for locking the rear end of the plow beam in any vertically adjusted position.

The draft means for the apparatus is connected to the rear end thereof to permit the forward end of the frame to move laterally and thus compensate for irregularities in the line of the stalks. A transverse draft bar 137 extends across the rear of the apparatus and is pivotally connected as at 138 to the upper end of a bracket 139. The bracket 139 preferably includes spaced parallel members as shown in Figure 4 and the lower ends of these bracket members are connected to the inner end portions of the lower braces 128, as at 140. The outer ends of the draft bar 137 are connected to draft links 141 (see Figures 2 and 10) and the forward ends of the links 141 are connected to a whiffletree 142 to which are connected singletrees 143. In this connection it will be noted that the apparatus is particularly adapted to be drawn along over the ground by mules or horses although it will be apparent that the apparatus is not limited to the particular draft means employed.

As shown in Figures 2, 14, and 15, the upper ends 17' of the forward vertical frame members 16' are slidable in the transverse member 17 and the outer ends of the member 17 are provided with horizontally curved bearing recesses as at 144. These curved portions are engaged by the correspondingly curved portions 145 of side bars 146 which diverge toward their rear ends. A transverse bar 147 moves across the top of the plate 12 in suitable guides 148, and the bar 147 is pivotally connected at its ends to the rear ends of the bars 146 as at 149. Forwardly of the frame member 144, the bars 146 converge as at 150 and terminate in a single forwardly extending tongue 151 adapted to be supported by the draft animals or means employed for propelling the apparatus. As shown in Figure 1, the side bars 146 are arranged outwardly of the horizontal frame members 10 and thus are adapted to engage the latter to limit the swinging movement of the forward end of the main frame of the apparatus with respect to the side bars 146.

The arrangement referred to permits the forward end of the main frame to swing laterally within reasonable limits to compensate for inaccuracies in the line of the stalks and such movement of the frame is effected by engagement of the shoes 97 with the stalks as the apparatus moves over the ground. Steering means, however, is provided for swinging the forward end of the main frame where such action is necessary to cause the stalks to enter between the shoes 97. A steering wheel 152 is arranged adjacent the rear end of the apparatus and in a position to be controlled by an operator occupying a seat 153. The steering wheel 152 operates a spool 154 around which pass a number of turns of a rope or cable 155. The two ends of this cable extend forwardly from the spool 154 and thence around a pulley 156 supported on the plate 12, and the ends of the cable are connected to the respective side bars 146 as at 157. Operation of the steering wheel thus moves the forward end of the main frame with respect to the respective side bars 146 to steer the forward end of the apparatus within reasonable limits where such action is necessary to cause the stalks to enter between the shoes 97.

Figure 3:
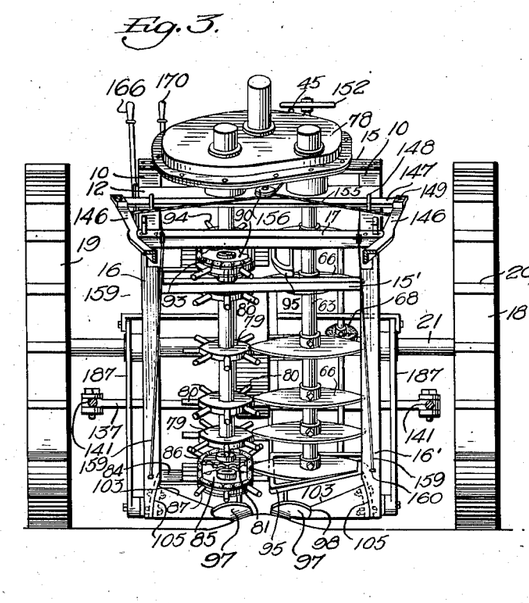
Figure 3 is a front elevation of the apparatus.

Means are provided for elevating the forward end of the main frame of the apparatus to move the plow point from the ground when the apparatus is turned. As shown in Figures 3, 14, and 15, the cross member 17 is provided with a pair of pulleys 158. A cable 159 passes over each pulley 158 and is connected at its lower end as at 160 to the lower ends of one of the posts 16'. Each of the cables 159 extends rearwardly for connection as at 161 to a crank 162, and these cranks are carried by a transverse shaft 163 supported in bearings 164 carried by the posts 14. The shaft 163 also may be supported intermediate its length by a bearing 165 suspended from the plate 15.

An operating lever 166 is connected to the shaft 163 and is provided with a detent 167 engageable in the notches of a quadrant 168 whereby the shaft 163 may be locked in selected positions. The operation of the handle 166 exerts a pull on the rear ends of the cables 159 to lift the frame with respect to the side bars 146. In this connection it will be noted that the tongue 151 is supported at its forward end by the draft animals and the cross bar 147 has sufficient play within its guides 148 to permit the forward end of the main frame to swing with respect to the side bars 146 whereby the frame may be elevated in the manner stated to lift the plow point from the ground when the apparatus is turning.

Figure 13:
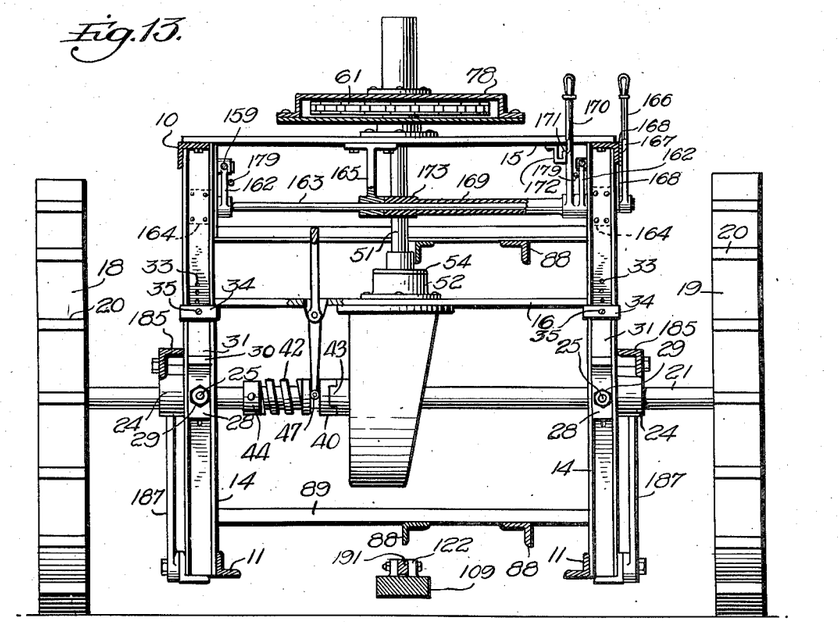
Figure 13 is a vertical sectional view on line 13—13 of Figure 7.

Referring to Figure 13, the numeral 169 designates an elongated sleeve surrounding the shaft 163 and provided adjacent one end with an operating handle 170 adapted to be locked in selected positions by a detent 171 engageable in the notches of a quadrant 172. One end of the sleeve 169 is provided with a collar portion 173 from which a crank 174 projects (see Figure 7). A rod 175 is connected at its upper end to the free end of the crank 174 and has its lower end pivotally connected to the plow beam 109 within the slot 125. This means is employed for raising and lowering the rear end of the plow beam.

As previously stated the lever 166 may be operated to elevate the forward end of the main frame and means is provided for locking the parts in adjusted position to relieve the quadrant 168 of undue strain. Referring to Figures 1, 14, and 15, the numeral 176 designates a leaf spring secured intermediate its ends to the rear face of the cross member 17 as at 176' and having its ends forming ratchet pawls 177. Each pawl 177 is engageable with ratchet teeth 178 formed in the rear edge of each vertical frame member 16', and each pawl is releasable by exerting a rearward pull on a cable 179. Each cable is connected at its forward end to one of the pawls 177 and at its rear end to one end of a crass bar 182 (see Figure 2). The bar 182 constitutes a handle which may be pulled rearwardly to release both of the pawls or latches 177 when the forward end of the frame is to be raised or lowered, and any suitable means (not shown) may be employed for supporting the bar 182.

Means also are provided for elevating the rear end of the apparatus, which is important for the practical operation thereof. For example, when the apparatus is used over relatively soft ground, the supporting wheels 18 and 19 will tend to embed themselves in the ground, thus lowering the elements adjacent the rear end of the apparatus a distance corresponding to the depth to which the wheels sink into the ground. Each of the bearing blocks 24 (see Figure 5) is provided with a knife bearing 38, as previously stated, and each of these bearings is offset from the plane of the adjacent post 14. Each bearing 38 is engageable in a notch 184 formed in a lever 185, and the rear ends of the two levers are connected by a treadle 186. The forward ends of the levers 185 are connected by links 187 to the lower frame members 11. The elements described are adapted to elevate the lower end of the apparatus in a manner to be described.

A leveler 188 is arranged rearwardly of the apparatus and is preferably in the form of a substantially V-shaped plow-like member having its lower edge substantially in a horizontal plane and operable for leveling off the ground which has been thrown up by the forward plow. The leveler is carried by the rear arm 189 of a lever which is pivotally supported as at 190 by the vertical post 126. The lever arm 189 is substantially arcuate as clearly shown in Figure 7. The forward arm 191 of the lever projects through a slot 192 formed in the vertical post 126 and is pivotally connected at its forward end as at 192' to the ears 122 of the plow beam.

The operation of the apparatus is as follows:

The apparatus is drawn over the ground by the pull exerted through the whiffletree 142 and associated elements, including the rods 141 and bar 137. Accordingly the propelling power is transmitted to the apparatus at the rear end thereof, thus permitting the forward end to swing freely within reasonable limits transversely of the direction of movement. In the normal operation of the apparatus the shoes 97 slide over opposite sides of the hill in which the stalks are rooted and the plow point 112 is maintained at a uniform depth in the ground to uproot the stalks. The shoes 97 are adjusted by the means shown in Figure 12 so that they may accommodate themselves to the angles of the side of the hill as indicated in Figure 3, and the pivotal connection of the shoes with the trunnions 102 permits the shoes to tilt forwardly and rearwardly to facilitate passage over uneven ground.

At the time the plant roots are engaged by the plow point, or slightly prior thereto, the fingers 94 of the upper chain 93 will engage the stalk and as the apparatus moves forwardly, the upper end of the stalk will move between the guide 95 and the adjacent run of the chain 93. Immediately after the uprooting of the stalk commences the fingers 87 of the lower chain will function in the same manner as the fingers 94, and the lower portion of the stalk will be guided between the lower guide 95 and the adjacent run of the chain 86. The chains and guides maintain the stalk substantially in a vertical position as the uprooting action continues, and the forward end of the plow beam is substantially parallel to the chains to tend to feed the stalks upwardly. The bottom blade of the plow point cuts the root completely free from the ground at the bottom of the plant while the roots are completely freed at the side of the plow point by the flanges 113.

As the stalk reaches a point adjacent the cutting blades 66, it is additionally engaged by the fingers 80 of the disks 79, and accordingly the stalk is pressed toward the cutting blades at points adjacent each blade except the lowermost blade. In connection with the latter blade, however, it will be noted that a double cutting action is provided in view of the additional blade 82 on the shaft 74, this double cutting action being provided in view of the greater thickness of the stalks near the bottom thereof. Thus the stalk will be cut into a number of small pieces which will fall to the ground to be turned under and thus rot in the soil and act as fertilizer. The sloping edge 120 of the plow beam attaching means (see Figures 7 and 16) feeds any trash or other material on the plow beam directly upwardly to the lower cutting blades 66 and 82 and thus prevents such material from jamming beneath these blades.

It will be apparent that the operating members referred to are driven by the wheel 19 in movement of the apparatus over the ground. The wheel 18 may be free of the shaft 21 to provide a differential action between the wheels 18 and 19 when the apparatus is being turned.

The wheel 19, however, rotates the shaft 21 to drive the gear 39 and thus rotate the pinion 48 and shaft 51. The shaft 51 drives the sprocket 60, and the chain 61 driven by this sprocket drives the sprockets 62 and 77. Obviously the sprocket 62 will be driven at a relatively high speed in view of its small diameter, and thus the cutting blades 66 also will be driven at a high rate of speed. The chains 86 and 93 will be driven at a much slower speed, and their linear speed with respect to the frame of the vehicle is substantially equal to the speed of movement of the apparatus over the ground.

When it is desired to elevate the forward end of the frame and support it in elevated position, as when turning from the end of one row to the adjacent end of the next row the lever 166 is employed for this purpose. The operator first pulls rearwardly on the bar 182, thus pulling the pawls 177 rearwardly, whereupon the operation of the lever 166 rocks the shaft 163 and its cranks 162. This action pulls the cables 159 rearwardly thus elevating the forward end of the frame with respect to the side bars 146, and when the proper elevation is reached, the bar 182 is released. Thus the forward end of the frame will be supported in any adjusted position and may be released by again pulling rearwardly on the bar 182 and unlatching the pawls 177 whereupon the lever 166 may be moved forwardly to lower the forward end of the frame.

The cutting depth of the plow point also may be adjusted as desired. To accomplish this, the operator first moves the handle 134 to rotate the shaft 131 and thus disengage the fingers 136 from the slots 124. The operator then may move the lever 170 rearwardly, swinging the arm 174 and rod 175 downwardly, thus depressing the rear end of the plow beam and elevating the forward end thereof. If a deeper plow cut is desired the handle 170 may be pushed forwardly, and when the proper depth is reached the handle 134 is again moved to rotate the fingers 136 into the slots 124.

The earth thrown up by the plow is leveled off by the leveler 188 at the rear of the apparatus. This member is preferably actuated by the rear end of the plow beam through the lever arms 189 and 191. When the rear end of the plow beam is depressed to elevate the plow point, less leveling is required and under such conditions the lever arms referred to slightly elevate the leveler. Conversely, the leveler will be lowered to some extent as the plow point is lowered to cause the latter to dig more deeply.

As previously stated, the supporting wheels 18 and 19 will sink to some extent when the apparatus is operating over soft ground, and under such conditions there is a tendency for trash, twigs, etc. to collect on the tops of the rear end portions of the side rails 11 and the plow beam 109. As soon as the operator notes the tendency of the supporting wheels to sink into the ground, he may depress the treadle 186. This action causes the levers 185 to pivot about their knife bearings 38, thus moving the forward ends of the levers 185 upwardly to exert an upward force on the links 187.

The knife bearings 38 are fixed against downward movement since they are supported with respect to the axle 21, and accordingly the links 187 transmit a lifting action to the portions of the frame members 11 to which they are connected. Since these points of connection lie substantially rearwardly of the center of gravity of the apparatus, it will be apparent that the rear end of the apparatus will be elevated while the supporting shoes 97 at the forward end of the apparatus continue to slide over the surface of the ground. The cross bar 16 (see Figure 8) which supports the gear housing 50 and the bearings for the shaft 51, is fixed with respect to the bearing housings 24 and thus remains in fixed relation with respect to the axle and supporting wheels. The shaft 51 is also similarly fixed with respect to the axle, and when the rear end of the apparatus is elevated in the manner stated, all of the remaining portions of the apparatus are elevated adjacent the rear end thereof, including the sprocket 60, and upward movement of the latter with respect to the shaft 51 is permitted by reason of the splined connection 60' between the shaft 51 and the sprocket 60. Thus the operator is free at any time to exert a downward force on the treadle 186 to elevate the rear end of the apparatus for the purpose stated.

During transportation of the apparatus from one point to another, all of the various parts of the apparatus may be rendered inoperative. The forward end of the frame may be elevated and latched in elevated position by the means described, and the clutch operating lever 45 may be moved to disengage the clutch 40. Under such conditions there will be no rotation of the bevel gear 39 and accordingly the various operating parts of the apparatus will remain inoperative.

It is never necessary to demount any of the cutters 66 in order to sharpen them. The stone 68 may be swung to the dotted line position shown in Figure 11 and arranged over any of the blades 66 and the stone rests by virtue of its own weight on the blade to engage the latter and continuously sharpen it during the operation of the apparatus as long as desired. This operation may be repeated with respect to each of the cutters 66, thus maintaining them in a sharpened condition. When not in operation, the stone 68 may remain in the inoperative position shown in solid lines in Figure 11.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A stalk cutter comprising a frame having forward and rear ends, supporting wheels for the rear end of said frame, stalk cutting means carried within said frame, supporting shoes for the forward end of said frame engageable with the surface of the ground, said shoes being spaced apart for the passage of stalks therebetween to guide the stalks to said stalk cutting means, and means connecting said shoes to said frame to permit them to swing on axes substantially transversely of said frame.

2. A stalk cutter comprising a frame having forward and rear ends, supporting wheels for the rear end of said frame, stalk cutting means carried within said frame, supporting shoes for the forward end of said frame engageable with the surface of the ground, said shoes being spaced apart for the passage of stalks therebetween to guide the stalks to said stalk cutting means, a support for each of said shoes, means connecting said shoes to said supports to permit them to swing on axes substantially transversely of said frame, and means for adjustably connecting said supports to the forward end of said frame to vary the transverse angles of said shoes with respect to the ground.

3. A stalk cutter comprising a frame having forward and rear ends, supporting wheels for the rear end of said frame, supporting means for the forward end of said frame, a plow beam extending longitudinally of said frame and having a plow point at its forward end normally movable under the surface of the earth to uproot stalks therefrom, means intermediate the ends of said plow beam for pivotally connecting it to said frame, and means for securing the rear end of said plow beam in selective vertically adjusted positions to vary the depth of the cut of said plow point.

4. A stalk cutter comprising a frame having forward and rear ends, supporting wheels for the rear end of said frame, supporting means for the forward end of said frame, a plow beam extending longitudinally of said frame and having a plow point at its forward end normally movable under the surface of the earth to uproot stalks therefrom, means intermediate the ends of said plow beam for pivotally connecting it to said frame, a vertical guide member for the rear end of said plow beam, said guide member and the rear end of said plow beam being provided with openings, and lock means passing into said openings to lock the rear end of said plow beam in selective vertically adjusted positions to vary the depth of the cut of said plow point.

5. A stalk cutter comprising a frame having forward and rear ends, supporting wheels for the rear end of said frame, supporting means for the forward end of said frame, a plow beam extending longitudinally of said frame and having a plow point at its forward end normally movable under the surface of the earth to uproot stalks therefrom, means intermediate the ends of said plow beam for pivotally connecting it to said frame, a head carried by the rear end of said plow beam and provided in its rear portion with a plurality of slots, a vertical guide channel carried by the rear end of said frame and receiving said head, said channel being provided with a slot, and a locking finger movable through the slot in said guide channel and engageable in one of the slots in said head to lock the rear end of said plow beam in selective vertically adjusted positions to vary the depth of the cut of said plow point.

6. A stalk cutter comprising a frame having forward and rear ends, supporting wheels for the rear end of said frame, supporting means for the forward end of said frame, a plow beam extending longitudinally of said frame and having a plow point at its forward end normally movable under the surface of the earth to uproot stalks therefrom, means intermediate the ends of said plow beam for pivotally connecting it to said frame, a head carried by the rear end of said plow beam and provided in its rear portion with a plurality of slots, a vertical guide channel carried by the rear end of said frame and receiving said head, said channel being provided with a slot, a shaft arranged parallel to said channel and having an operating handle at its upper end, a locking finger carried by said shaft adjacent its lower end and movable through the slot in said channel and engageable in one of the slots in said head to lock the rear end of said plow beam in vertically adjusted positions to vary the depth of the cut of said plow point, and means for raising and lowering the rear end of said plow beam when said finger is released from said head.

7. Apparatus constructed in accordance with claim 6 wherein the means for raising and lowering the rear end of said plow beam comprises a rotatable member, an operating lever connected to said rotatable member, a crank carried by said rotatable member, and a rod connecting said crank to the rear end of said plow beam to raise and lower it upon operation of said lever.

8. A stalk cutter comprising a frame having forward and rear ends, supporting wheels at the rear end of said frame, means for supporting the forward end of said frame and guiding it with respect to a line of stalks, a vertical shaft mounted in said frame, transmission means connected between one of said wheels and said shaft, a plurality of rotary cutters carried by said shaft, the lowermost cutter being arranged adjacent the bottom of said frame, a plow beam extending longitudinally of said frame adjacent the bottom thereof and having a plow point at its forward end movable beneath the surface of the earth to uproot the stalks, and means for pivotally connecting said plow beam intermediate its length to said frame and including a member having an inclined forward portion leading from the top of said plow beam upwardly to the lowermost cutter.

9. Apparatus constructed in accordance with claim 8 wherein said plow beam is provided with a vertical slot, said member having a portion arranged in said slot, and pivot means passing through said plow beam and said member.

10. Apparatus constructed in accordance with claim 8 wherein said plow point is detachably connected to the forward ends of said beam and includes a flat bottom blade having a point at its forward end and upstanding flange portions at the sides thereof.

11. A stalk cutter comprising a frame having forward and rear ends, supporting wheels for the rear end of said frame, spaced supporting shoes for the forward end of said frame slidable over the surface of the earth, stalk cutting means within said frame engageable with stalks passing between the shoes to cut them into pieces, draft means connected to the rear end of said frame, side bars connected to the top of said frame intermediate its length, a supporting tongue extending forwardly from said side bars, a plow carried by said frame and normally movable beneath the surface of the earth to uproot the stalks, and means operable between said side bars and the forward end of the frame for elevating the latter to lift said plow out of engagement with the earth.

12. Apparatus constructed in accordance with claim 11 provided with means engageable with portions of said frame to maintain the forward end of the latter in elevated position with respect to said side bars.

13. Apparatus constructed in accordance with claim 11 wherein the means for elevating the forward end of said frame comprises a pair of pulleys fixed with respect to said side bars, a flexible member passing forwardly over each of said pulleys and downwardly for connection with the forward end of said frame, and means for pulling the rear ends of said flexible members to elevate the forward end of said frame.

14. Apparatus constructed in accordance with claim 11 wherein the means for elevating the forward end of said frame comprises a pair of pulleys fixed with respect to said side bars, a flexible member passing forwardly over each of said pulleys and downwardly for connection with the forward end of said frame, means for pulling the rear ends of said flexible members to elevate the forward end of said frame, a pair of latches, said frames having forward portions provided with ratchet teeth engageable by said latches to hold the forward end of said frame in elevated position, and means operable from a point adjacent the rear end of said frame for releasing said latches.

15. A stalk cutter comprising a frame having forward and rear ends, supporting wheels for the rear end of said frame, supporting shoes for the forward end of said frame movable over the surface of the earth and operative for guiding the forward end of said frame laterally with respect to a line of stalks, stalk cutting means arranged in said frame, draft means connected to the rear end of said frame, side bars arranged at the forward end of said frame at the top thereof, said side bars diverging toward their rear ends and having their forward ends connected to said frame to swing in a horizontal plane, a supporting tongue extending forwardly from said side bars, and steering means carried by said frame and including elements connected to the rear ends of said side bars to move them inwardly and outwardly with respect to said frame.

16. Apparatus constructed in accordance with claim 15 wherein said steering means comprises a wheel arranged adjacent the rear end of said frame at the top thereof, a spool carried by said wheel, a flexible element passing around said spool, and pulley means arranged forwardly of said steering wheel and around which the end portions of said flexible elements pass in opposite directions, the ends of said flexible elements being connected to the rear ends of said side bars.

17. A stalk cutter comprising a frame having forward and rear ends, supporting wheels for the rear end of said frame, supporting shoes for the forward end of said frame movable over the surface of the earth and operative for guiding the forward end of said frame laterally with respect to a line of stalks, stalk cutting means arranged in said frame, draft means connected to the rear end of said frame, side bars arranged at the forward end of said frame at the top thereof, said side bars diverging toward their rear ends and having their forward ends connected to said frame to swing in a horizontal plane, a supporting tongue extending forwardly from said side bars, a transverse bar connected to the rear end of said side bars and supported on the top of said frame, guide means for said transverse bar, pulleys fixed with respect to said side bars adjacent the forward ends thereof, a flexible element passing forwardly over each of said pulleys and then downwardly for connection with the forward end of said frame, a transverse shaft carried by said frame adjacent the rear end thereof and provided with an operating handle, and a crank arm carried by said shaft adjacent each side of said frame and connected to the rear ends of said flexible elements.

18. Apparatus constructed in accordance with claim 17 wherein said frame includes forward corner posts provided with ratchet teeth in their rear edges, a pair of pawls fixed with respect to said side bars and engageable with the teeth of the corner posts, and means operable from the rear end of said frame for releasing said pawls.

19. A stalk cutter comprising a frame having forward and rear ends and movable over the surface of the earth, means carried by said frame for cutting stalks, means for supporting the forward end of said frame with respect to the ground, supporting wheels for the rear end of said frame, means for transmitting power from said wheels to said cutting means, and means for elevating the rear end of said frame with respect to said wheels, said transmission means including a slidable connection for permitting elevation of said frame with respect to said wheels.

20. A stalk cutter comprising a frame having forward and rear ends and movable over the surface of the earth, means carried by said frame for cutting stalks, supporting means for the forward end of said frame, supporting wheels for the rear end of said frame, a treadle operative for elevating the rear end of said frame with respect to said wheels, and transmission means connected between said wheels and said cutting means, said transmission means including a rotary member and a drive shaft therefor having splined connection with each other to permit elevation of the rear end of said frame with respect to said wheels.

21. A stalk cutter comprising a frame movable over the surface of the earth, an upstanding shaft, means for driving said shaft, a plurality of rotary cutting blades carried by said shaft, a circular sharpening stone for said blades, and means for supporting said stone with respect to said frame for movement into engagement with either of said blades.

22. A stalk cutter comprising a frame movable over the surface of the earth, an upstanding shaft, means for driving said shaft, a plurality of rotary cutting blades carried by said shaft, a circular sharpening stone for said blades, a rod parallel to said shaft, an arm arranged at each end of said rod, each arm being connected at one end to said rod and pivotally connected at its opposite end to said frame, said stone being mounted for vertical and rotating movement on said rod, and means for securing said rod in adjusted positions around the pivot axis of said arms.

23. A stalk cutter comprising a frame, means for supporting said frame for movement over the ground, a plow beam having a plow point at its forward end operative for uprooting stalks, means within said frame for cutting the stalks, means for raising and lowering said plow point, a leveler arranged rearwardly of said plow beam, and means for raising and lowering said leveler simultaneously with said plow point.

24. A stalk cutter comprising a frame, means for supporting said frame for movement over the ground, a plow beam having a plow point at its forward end operative for uprooting stalks, means within said frame for cutting the stalks, pivotal supporting means for said plow beam connected thereto intermediate its ends, means for raising and lowering the rear end of said plow beam, a leveler arranged rearwardly of said plow beam, and a supporting lever for said leveler connected thereto at its rear end, said lever being pivotally supported intermediate its ends and having its forward end pivotally connected to said plow beam adjacent the rear end thereof.

PERRY W. SPELL.